US011901989B2

United States Patent
Sun et al.

(10) Patent No.: US 11,901,989 B2
(45) Date of Patent: Feb. 13, 2024

(54) TRIGGERING APERIODIC CHANNEL STATE INFORMATION (CSI) REPORTING BASED ON DOWNLINK CONTROL INFORMATION (DCI)

(71) Applicant: Apple Inc., Cupertino, CA (US)

(72) Inventors: Haitong Sun, Cupertino, CA (US); Yushu Zhang, Beijing (CN); Chunxuan Ye, San Diego, CA (US); Dawei Zhang, Saratoga, CA (US); Hong He, San Jose, CA (US); Huaning Niu, San Jose, CA (US); Jie Cui, San Jose, CA (US); Oghenekome Oteri, San Diego, CA (US); Seyed Ali Akbar Fakoorian, San Diego, CA (US); Wei Zeng, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 231 days.

(21) Appl. No.: 17/439,381

(22) PCT Filed: May 8, 2021

(86) PCT No.: PCT/CN2021/092293
§ 371 (c)(1),
(2) Date: Sep. 14, 2021

(87) PCT Pub. No.: WO2022/236454
PCT Pub. Date: Nov. 17, 2022

(65) Prior Publication Data
US 2022/0360306 A1    Nov. 10, 2022

(51) Int. Cl.
*H04B 7/06* (2006.01)
*H04L 5/00* (2006.01)
*H04W 72/23* (2023.01)

(52) U.S. Cl.
CPC ......... *H04B 7/0626* (2013.01); *H04L 5/0053* (2013.01); *H04W 72/23* (2023.01)

(58) Field of Classification Search
CPC ... H04B 7/0626; H04L 5/0053; H04L 5/0051; H04L 1/1858; H04W 72/0446
See application file for complete search history.

(56) References Cited

U.S. PATENT DOCUMENTS

2020/0107319 A1*   4/2020   Bagheri .................. H04L 1/08
2020/0259625 A1*   8/2020   Papasakellariou ... H04B 7/0626
(Continued)

FOREIGN PATENT DOCUMENTS

CN   110460416       11/2019
CN   110650001 A      1/2020
(Continued)

OTHER PUBLICATIONS

CSI Feedback Enhancements for IIoT/URLLC, Ericsson, 3GPP TSG-RAN WG1 Meeting #103-e, R1-2007708, Nov. 2020, pp. 1-13.
(Continued)

*Primary Examiner* — Mohamed A Kamara
(74) *Attorney, Agent, or Firm* — Kilpatrick Townsend & Stockton LLP

(57) ABSTRACT

The present application relates to devices and components including apparatus, systems, and methods to perform aperiodic channel state information (AP-CSI) reporting. In an example, downlink control information (DCI) having a format for scheduling physical downlink shared channel (PDSCH) data reception, such as DCI format 1_1 or 1_2, is used to also trigger AP-CSI reporting. A generated AP-CSI report can be sent, for instance, on a physical uplink control channel (PUCCH).

20 Claims, 12 Drawing Sheets

(56) References Cited

U.S. PATENT DOCUMENTS

| | | | |
|---|---|---|---|
| 2020/0295903 A1 | 9/2020 | Faxér | |
| 2020/0313816 A1 | 10/2020 | Sun et al. | |
| 2020/0343954 A1* | 10/2020 | Takeda | H04W 76/11 |
| 2020/0389218 A1* | 12/2020 | Faxér | H04B 7/0626 |
| 2021/0014893 A1 | 1/2021 | Park et al. | |
| 2021/0135725 A1 | 5/2021 | Kim et al. | |
| 2021/0345285 A1 | 11/2021 | Tenny et al. | |
| 2021/0376963 A1* | 12/2021 | Liang | H04L 1/1858 |
| 2022/0232535 A1 | 7/2022 | Abdelghaffar et al. | |
| 2022/0394754 A1* | 12/2022 | Ko | H04W 72/0446 |
| 2023/0122786 A1 | 4/2023 | Bang et al. | |
| 2023/0171062 A1* | 6/2023 | Khoshnevisan | H04L 5/0051 |
| | | | 370/329 |

FOREIGN PATENT DOCUMENTS

| | | |
|---|---|---|
| CN | 111386668 | 7/2020 |
| CN | 111885683 | 11/2020 |
| WO | 2019191871 | 10/2019 |
| WO | 2019213914 | 11/2019 |
| WO | 2020017240 | 1/2020 |

OTHER PUBLICATIONS

On CSI feedback in NR, 3GPP TSG RAN WG1 Meeting #91, Huawei, R1-1719834, Dec. 2017, 5 pages.

Views on URLLC CSI Feedback Enhancements, Apple Inc., 3GPP TSG- RAN WG1 Meeting #104b-e, R1-2103104, Apr. 2020, pp. 1-8.

International Patent Application No. PCT/CN2021/085488, International Search Report and Written Opinion, dated Jan. 7, 2022, 9 pages.

International Patent Application No. PCT/CN2021/092293, International Search Report and the Written Opinion, dated Jan. 30, 2022, 9 pages.

3rd Generation Partnership Project; Technical Specification Group Radio Access Network; NR; Physical layer procedures for data (Release 16), 3GPP TS 38.214 V16.5.0, Mar. 2021, 171 pages.

3rd Generation Partnership Project; Technical Specification Group Radio Access Network; NR; Radio Resource Control (RRC) protocol specification (Release 16), 3GPP TS 38.331 V16.4.1, Mar. 2021, 949 pages.

"Discussion on SRS Enhancement", R1-2101451, 3GPP TSG-RAN WG1 Meeting #104-e , Jan. 19, 2021 , 41 pages.

"Enhancements on SRS" , 3GPP TSG RAN WG1#104-e, R1-2100-277 , Jan. 25-Feb. 5, 2021 , 10 pages.

The U.S. Appl. No. 17/441,650, "Non-Final Office Action," dated Jun. 6, 2023, 10 pages.

The European Patent Application No. EP21867888.6, "Extended European Search Report," , 10 pages.

"3GPP TS 38.212 V16.5.0" , 3rd Generation Partnership Project; Technical Specification Group Radio Access Network; NR; Multiplexing and Channel Coding (Release 16), Mar. 30, 2021, 152 pages.

The U.S. Appl. No. 17/441,650, "Notice of Allowance", dated Sep. 21, 2023, 7 pages.

The International Application No. PCT/CN2021/085488, "International Preliminary Report on Patentability", dated Oct. 12, 2023, 5 pages.

* cited by examiner

TRIGGERING APERIODIC CHANNEL STATE INFORMATION (CSI) REPORTING BASED ON DOWNLINK CONTROL INFORMATION (DCI)

CROSS-REFERENCE TO RELATED APPLICATIONS

This application is a U.S. National Stage Application of PCT/CN2021/092293, filed May 8, 2021. The disclosure of which is herein incorporated by reference in its entirety for all purposes.

Fifth generation mobile network (5G) is a wireless standard that aims to improve upon data transmission speed, reliability, availability, and more. This standard, while still developing, includes numerous details relating to estimating a quality of a channel used for communication between a user equipment (UE) and a network (e.g., a base station of the network) in order to improve the communication's quality of service.

DETAILED DESCRIPTION

Figure 1:
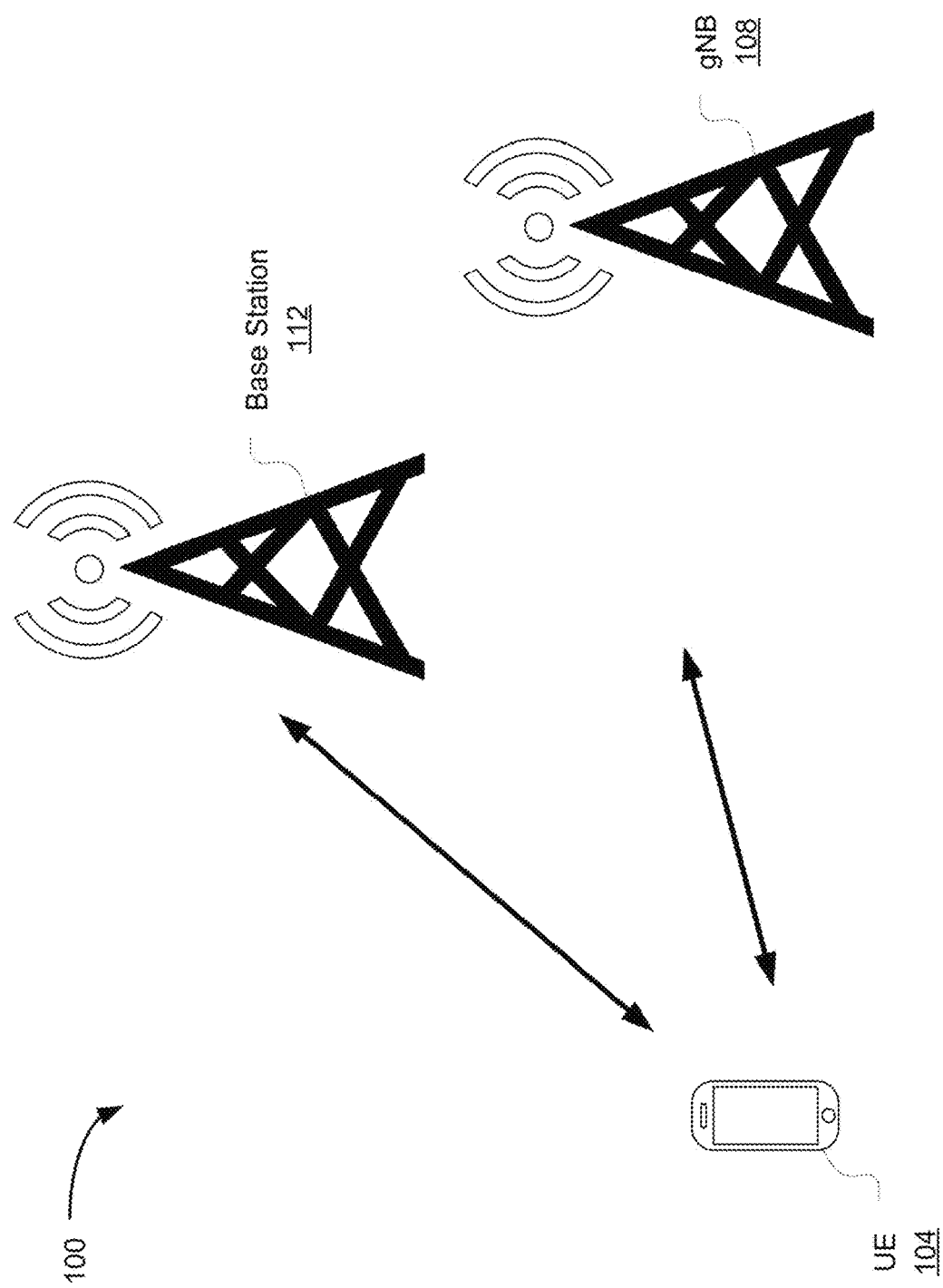
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a user equipment (UE) can communicate with a network, such as those with one or more base stations or other network nodes, using channels that include, for instance, a physical downlink shared channel (PDSCH) for data reception and a physical uplink control channel (PUCCH) for uplink control information transmission. Channel state information (CSI) can be reported from the UE to the network to indicate various quality measurements related to one or more channels, including for the PDSCH. The network can configure the UE for aperiodic CSI (AP-CSI) reporting. Subsequently, the network can trigger the UE to send an AP-CSI report.

In an example, the trigger can include downlink control information (DCI) having a format for scheduling data reception on the PDSCH. Because of this format, this DCI can be referred to as a downlink (DL) DCI and is different from uplink (UL) DCI that has a format for scheduling an uplink transmission from the UE. For instance, the DL DCI has a format 1_1 or 1_2, although other formats that can be defined for scheduling PDSCH data reception are possible. Upon determining the trigger based on the DL DCI, the UE can generate an AP-CSI report according to one of the UE's CSI configurations. The UE can send the AP-CSI report on a set of resource elements of the PUCCH. As such, DL DCI for PDSCH scheduling is used to trigger the AP-CSI reporting and the resulting AP-CSI report is sent on the PUCCH.

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network node of a communications network (or, more briefly, network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and MAC layers; the transport channels may transfer data between the MAC and PHY layers; and the physical channels may transfer information across the air interface. The physical channels may include a physical broadcast channel (PBCH), a physical downlink control channel (PDCCH), and a PDSCH.

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure (including cell selection and reselection) and for beam selection.

The PDSCH may be used to transfer end-user application data, signaling radio bearer (SRB) messages, system information messages (other than, for example, MIB), and paging messages.

The PDCCH may transfer DCI that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include CSI reference signals (CSI-RS). The CSI-RS may be a multi-purpose downlink transmission that may be used for CSI reporting, beam management, connected mode mobility, radio link failure detection, beam failure detection and recovery, and fine-tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

The UE 104 may transmit data and control information to the gNB 108 using physical uplink channels. Different types of physical uplink channels are possible including, for instance, a PUCCH and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

In an example, communications with the gNB 108 and/or the base station can use channels in the frequency range 1 (FR1) band, frequency range 2 (FR2) band, and/or other frequency range bands. The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should apply a clear channel assessment (CCA) check before using the channel.

As further illustrated in FIG. 1, the network environment 100 may further include a base station 112 with which the UE 104 may also connect. The base station 112 supports the same RAT as the gNB 108 (e.g., the base station 112 is also a gNB). Additionally or alternatively, the base station 112 supports a different RAT (e.g., Long-Term Evolution (LTE) eNB).

Figure 2:
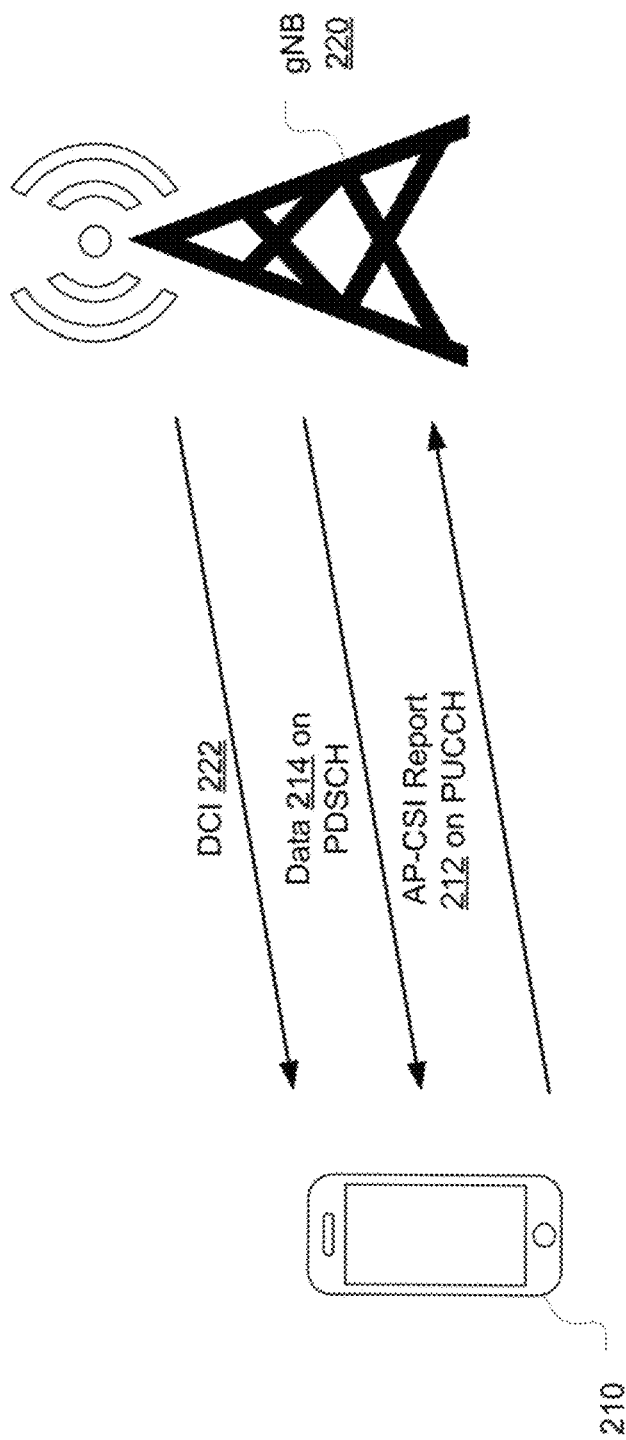
FIG. 2 illustrates an example of a downlink control information (DCI) based trigger for aperiodic channel state information (AP-CSI) reporting, in accordance with some embodiments.

FIG. 2 illustrates an example of a DCI-based trigger for AP-CSI reporting, in accordance with some embodiments. In the illustration, a UE 210, similar to the UE 104 of FIG. 1, communicates with a gNB 220, similar to the gNB 108 of FIG. 1, using multiple channels, including a PDSCH and a PUCCH. The gNB 220 sends DCI 222 to the UE 210 to schedule reception of data 214 on the PDSCH. The DCI 222 can also trigger the UE 210 to send an AP-CSI report 212 on the PUCCH.

In an example, the DCI 222 is DL DCI having a format for scheduling data reception on the PDSCH, such as format 1_1 or 1_2. The DCI 222 can be sent from the gNB 220 over a PDCCH. The DCI 222 can schedule an actual data reception on the PDSCH, while also triggering the UE 210 to generate and send the AP-CSI report 212. Alternatively, although usable for data reception scheduling, the DCI 222 may actually not schedule the data reception and may instead merely trigger the UE 210 to generate and send the AP-CSI report 212.

Various approaches are possible to trigger the AP-CSI reporting based on the DCI 222 and are further illustrated in the next figures. These approaches include, for instance, using a CSI request field in the DCI 222, scrambling a cyclic redundancy check (CRC) with a radio network temporary identifier (RNTI) specific to the AP-CSI reporting, and/or repurposing existing DCI fields. The DCI 222 can also indicate a PUCCH resource and/or timing of the PUCCH resource for sending the AP-CSI report. Further, the DCI 222 can indicate timing of reference signals (e.g., CSI-RSs) on which measurements are to be performed to generate the AP-CSI report.

Variations to the above DCI-based AP-CSI reporting are possible. For instance, the AP-CSI report 212 can be generated and used locally by the UE 210, whereby the UE 210 need not send the AP-CSI report 212 to the gNB 220 (e.g., on the PUCCH or on a PUSCH). For instance, the UE 210 can be configured to perform CSI measurements related to aperiodic timing and frequency tracking (AP-TRS) and/or beam refinement for receiver (e.g., FR2 P3 procedure). In this case, the AP-CSI report 212 is triggered by the DCI 222 but is not sent to the gNB 220. In another variation, the DCI 222 triggers the AP-CSI report 212 to be sent on a PUSCH instead of the PUCCH.

Figure 3:
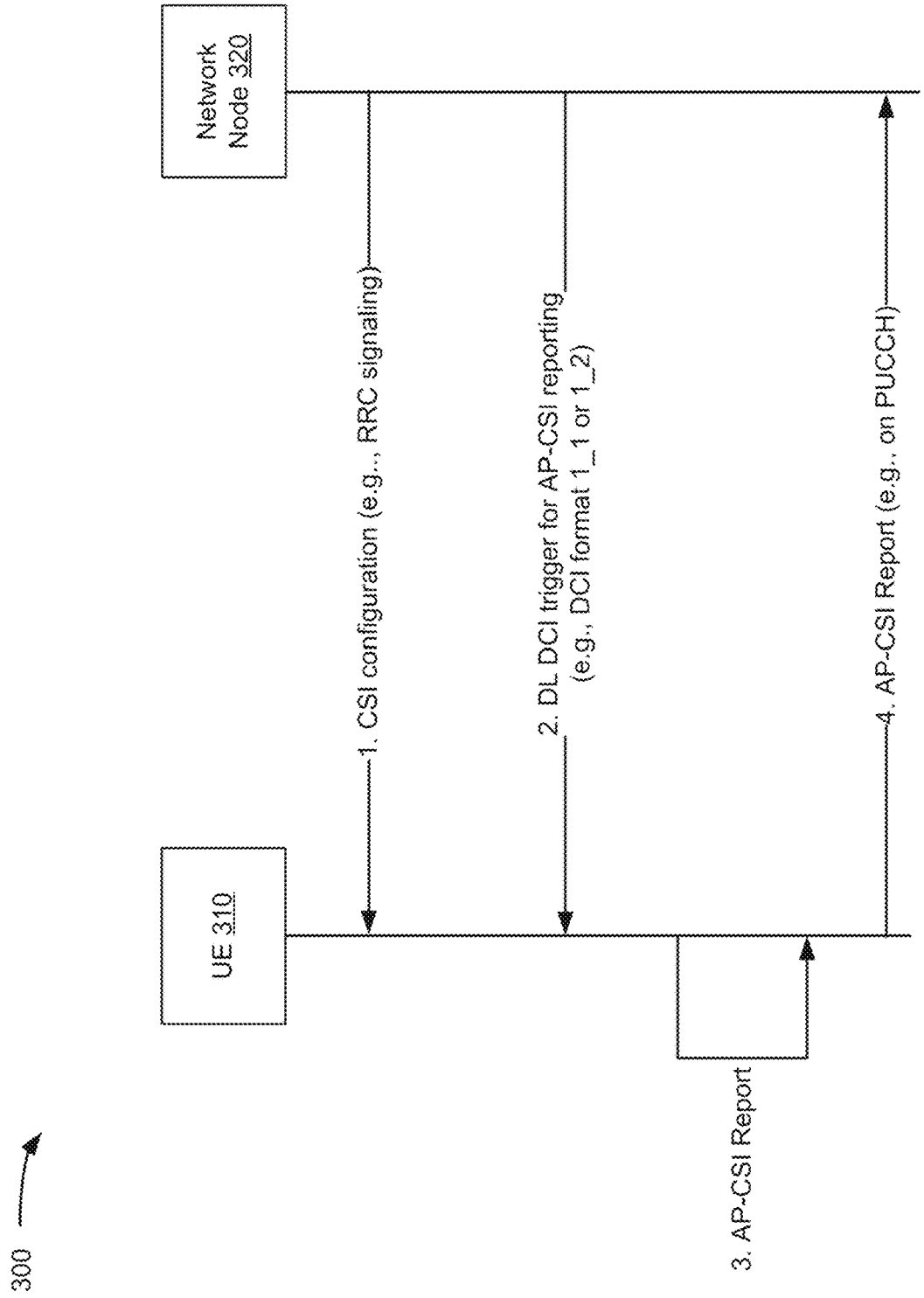
FIG. 3 illustrates an example of a sequence diagram between a user equipment (UE) and a network node for using DCI to trigger AP-CSI reporting, in accordance with some embodiments.

FIG. 3 illustrates an example of a sequence diagram 300 between a UE 310 and a network node 320 for using DCI to trigger AP-CSI reporting, in accordance with some embodiments. The network node 320 initially configures the UE for AP-CSI reporting and subsequently triggers the UE 310 to send an AP-CSI report. The CSI configuration can be carried via, for instance, radio resource control (RRC) signaling, whereas the triggering can be carried via, for instance, DL DCI such as DCI 222 of FIG. 2. The UE 310 is an example of the UE 210 of FIG. 2. The network node 320 can be a base station, such as the gNB 220 of FIG. 2, or another node of a network in communication with the UE, such as a radio network core. Further, in the case of a base station, the base station that sends the CSI configuration via RRC signaling may, but need not, be different from the base station that sends the DL DCI.

As illustrated, in a first step of the sequence diagram 300, the network node 320 sends CSI configuration via RRC signaling to the UE 310. For instance, the network node 320 sends information that configures the UE 310 for AP-CSI reporting in one or more RRC messages (e.g., RRC Connection Reconfiguration or RRC Connection Setup). This information can indicate a number of trigger states (e.g., one-hundred twenty-eight trigger states indicated in CSI-AperiodicTriggerStateList), each of which can be associated with a number of AP-CSI reports (e.g., up to sixteen AP-CSI reports per trigger state). Different CSI-reporting related configuration information can be included, such as the type of reports (e.g., wideband, sub-band, channel quality indicator (CQI), pre-coding matrix indicator (PMI), layer indicator (LI), rank indicator, and the like).

Subsequently, the network node 320 sends DL DCI for AP-CSI reporting. The DL DCI can have format 1_1 or 1_2 and can include, for instance, a CSI request field having a number of bits (e.g., three or four bits). The values of the bits indicate a trigger state from the configured triggered states. The network node 320 can also send reference for measurements (e.g., CSI-RS or SSB). Accordingly, the UE 310 determines the trigger state based on the bit values in the CSI request field. Given the CSI configuration related to the trigger state and the associated CSI report(s), the UE performs measurements on the reference signals and generates an AP-CSI report (or a plurality of such reports as applicable). As indicated in the last step of the sequence diagram 300, the UE 310 can send the AP-CSI report on a PUCCH to the network node 320. For instance, the AP-CSI report is sent in a set of PUCCH resources and, in certain situations, the AP-CSI report is repeatedly sent in PUCCH repetitions.

Figure 4:
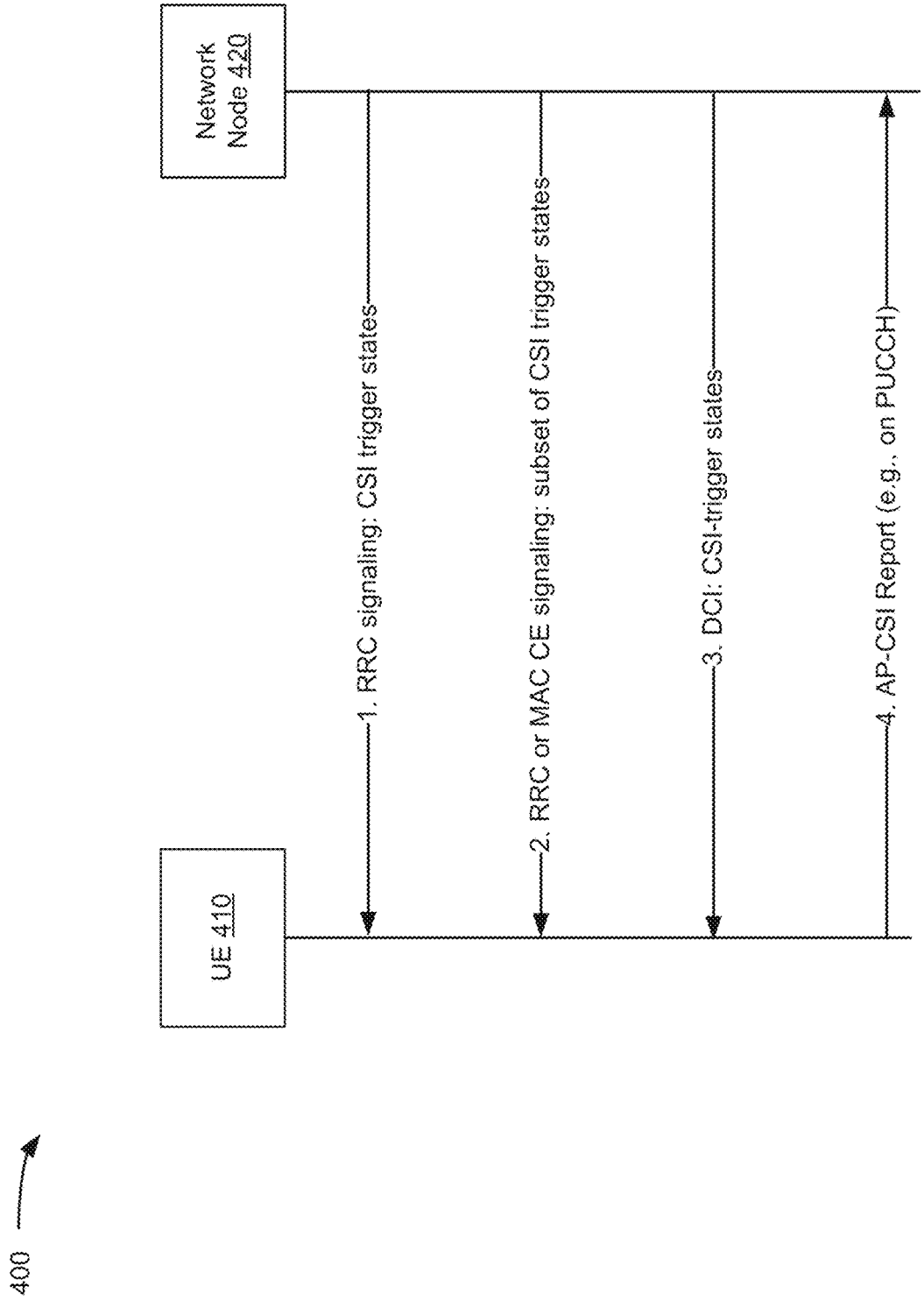
FIG. 4 illustrates another example of a sequence diagram between UE and a network node for using DCI to trigger AP-CSI reporting, in accordance with some embodiments.

FIG. 4 illustrates another example of a sequence diagram 400 between UE 410 and a network node 420 for using DCI to trigger AP-CSI reporting, in accordance with some embodiments. The sequence diagram 400 is similar to the sequence diagram 400, except for the use of additional signaling to activate a subset of a plurality of configured trigger states. Similarities are not repeated herein in the interest of brevity.

As illustrated, in a first step of the sequence diagram 400, the network node 420 sends CSI configuration via RRC signaling to the UE 410. For instance, the network node 420 configures a number of trigger states (e.g., one-hundred twenty-eight trigger states indicated in CSI-AperiodicTriggerStateList) for the UE 410. In a second step of the sequence diagram 400, the network node 420 sends information to activate a subset of these trigger states (e.g., sixteen trigger states out of the one-hundred twenty-eight trigger states). This information can be sent using RRC signaling (e.g., in one or more RRC messages including, for instance, RRC Connection Reconfiguration or RRC Connection Setup) or using medium access control (MAC) control element (CE) signaling (e.g., one or more MAC CEs). The RRC message(s) and/or MAC CE(s) can identify the subset.

Subsequently, the network node 420 sends DL DCI for AP-CSI reporting. A CSI request field can have a number of bits, whereby the possible values of these bits can be equal to the size of the trigger state subsets (e.g., if this subset includes sixteen trigger states, the CSI request field uses four bits). The UE 410 determines the value indicated by the bits of the CSI request field and determines the corresponding trigger state from the subset. Given the CSI configuration related to the trigger state and the associated CSI report(s), the UE performs measurements on reference signals and generates an AP-CSI report (or a plurality of such reports as applicable). As indicated in the last step of the sequence diagram 400, the UE 410 can send the AP-CSI report on a PUCCH to the network node 420.

Although FIGS. 3 and 4 describe that the DL DCI includes a CSI request field, other variations are possible to identify an RRC-configured and/or an RRC/MAC-CE activated trigger state. As described in the next figure, these variations include the use of RNTI specific for AP-CSI reporting and/or the repurposing of bits found in the DL DCI and used for other purposes.

Figure 5:
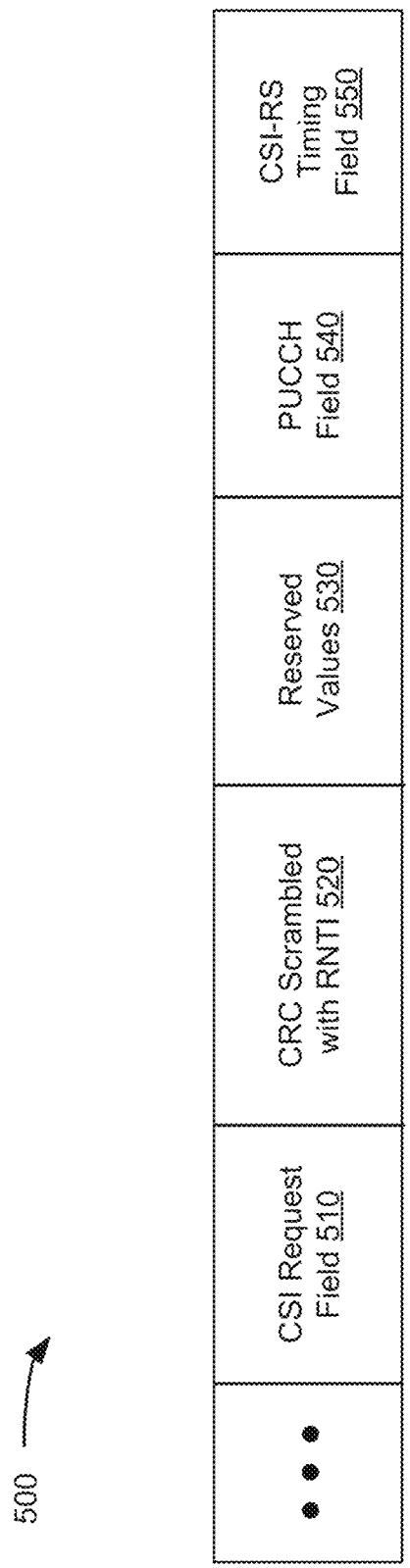
FIG. 5 illustrates an example of fields of DCI usable to trigger AP-CSI reporting, in accordance with some embodiments.

FIG. 5 illustrates an example of fields of DCI 500 usable to trigger AP-CSI reporting, in accordance with some embodiments. Although the different fields are shown as being co-existent, the DCI 500 may actually include only one or a subset of such fields. In other words, the fields are shown for illustrative purposes to describe different variations and combinations of variations for configuring the DCI 500 to trigger AP-CSI reporting.

In an example, the DCI 500 is DL DCI usable for scheduling data reception on a PDSCH. For instance, the DCI 500 has format 1_1 or 1_2. In this case, the DCI 500 includes multiple fields specific to the scheduling, and these fields are generally indicated with the three dots and are defined in 3GPP technical specifications.

Further, the DCI 500 includes fields for triggering the AP-CSI reporting including, for instance, a CSI request field 510, a field 520 for CRC scrambled with RNTI, a reserved values field 530, a PUCCH field 540, and/or a CSI-RS timing field 550. Each of these fields can have a bit length and the values of the bits thereof can be used to trigger the AP-CSI reporting and/or to indicate attributes of the AP-CSI reporting.

In an example, the CSI request field 510 is added to DCI format 1_1 or 1_2 and can include a number of bits that indicate a trigger state from configured and/or activated trigger states (e.g., three bits to indicate eight trigger states, four bits to indicate sixteen trigger states, or another number of bits). In particular, a CSI configuration can be defined (e.g., via RRC signaling and/or MAC CE signaling) and indicate possible trigger states. The values of the bits of the CSI field 510 correspond to one of these possible states.

In another example, the CSI request field 510 can be one bit long. A first value of the bit (e.g., a "1") indicates that a UE should report AP-CSI, whereas a second value of the bit (e.g., a "0") indicates that no AP-CSI should be reported. In this example, the RRC signaling and/or MAC CE signaling can indicate a particular trigger state that is used for the AP-CSI reporting when triggered.

In both examples above, the fields of the DCI 500 for scheduling data reception may not be altered. If so, the DCI 500 including the CSI request 510 can have multiple simultaneous functions, including triggering the AP-CSI reporting and scheduling the data reception on a PDSCH. Although capable of these simultaneous functions, the DCI 500 can be used to only trigger the AP-CSI reporting in certain situations or to only schedule the data reception in other situation.

In comparison, RRC signaling can be used to indicate an RNTI (e.g., a value represented by sixteen bits) that is associated with the AP-CSI reporting. This RNTI can be referred to herein as AP-CSI RNTI to distinguish from other RNTIs usable for other purposes (e.g., a cell RNTI (C-RNTI) usable for identifying RRC Connection and scheduling). A CRC included in the DCI is scrambled using one of the RNTIs. When the scrambling uses the AP-CSI RNTI, this scrambled field 520 of the DCI 500 can be interpreted by the UE as triggering the AP reporting. In the case where multiple trigger states are configured and/or activated for the UE, bit values in or more other fields of the DCI 500 can indicate the specific trigger state to use for the AP-CSI reporting. When the AP-CSI RNTI CRC-scrambled field 520 is used to trigger the AP-CSI reporting, other fields of the DCI 500 may still be usable to schedule the data reception. Thus, like in the above CSI request field 510 example, the DCI 500 implementing the AP-CSI RNTI CRC-scrambled field 520 can provide the simultaneous functions of AP-CSI triggering and data reception scheduling.

In certain situations, the DCI 500 includes one or more fields having reserved values. These reserved values are not usable for scheduling the data reception. Accordingly, the reserved values can be repurposed to trigger the AP-CSI reporting when they are indicated in the reserved values field 530 of the DCI. For example, the reserved values field 530 include one or more of a frequency domain resource assignment field, a time domain resource assignment field, a virtual resource block-to-physical resource block (VRB-to-PRB) mapping field, a PRB bundling size indicator field, a rate matching indicator field, a modulation and coding scheme field, a new data indicator field, a redundancy version field, a hybrid automatic repeat request (HARQ) process number field, and/or an antenna port(s) fields. Some or all of these fields may not be used when PDSCH data reception is not scheduled. Accordingly, one or more of these fields can be repurposed in such a situation, whereby a reserved value(s) is indicated in the field(s) and the reserved value(s) is interpreted by the UE as an AP-CSI trigger. In this case, the DCI 500 is only usable to trigger the AP-CSI trigger and cannot be used to schedule the PDSCH data reception. Nonetheless, in other situations, the PDSCH data reception can be scheduled without using all these fields. If so, an unused field(s) can be repurposed (e.g., by using a reserved value(s)) to trigger the AP-CSI reporting.

In the above examples, multiple trigger states are configured for the UE and the DCI 500 can indicate one of the states. Alternatively, RRC and/or MAC-CE signaling can be used to define a semi-static configuration of the AP-CSI reporting. For instance, the semi-static configuration indicates a specific trigger state. In this situation, the DCI 500 can be used to merely trigger the AP-CSI reporting without the need to indicate the trigger state. In other words, the CSI request field 510 can be one bit long, the CRC may be merely scrambled with AP-CSI RNTI, or a single reserved bit can be used in the DCI 500.

The DCI 500 can further trigger the AP-CSI reporting on PUCCH. In this case, the PUCCH field 540 can be used. In an example, the PUCCH field 540 indicates a set of PUCCH resource(s) to carry AP-CSI. For instance, this field 540 includes a "PUCCH resource indicator" field of DCI format 1_1 or 1_2. Generally, the "PUCCH resource indicator" is used for HARQ ACK/NACK. When the DCI 500 also schedules PDSCH data reception, the AP-CSI can be multiplexed with the HARQ ACK/NACK based on the PUCCH resource indicator. When the DCI 500 does not schedule PDSCH data reception, the AP-CSI need not be multiplexed and be sent, rather than the sending of HARQ ACK/NACK, based on the PUCCH resource indicator.

Additionally or alternatively, the PUCCH field 540 can indicate a timing offset for a PUCCH resource. In one example, the PUCCH field 540 includes the "PDSCH-to-HARQ_feedback timing indicator" field of DCI format 1_1 or 1_2. As in the above example, when the DCI 500 also schedules PDSCH data reception, the PDSCH-to-HARQ_feedback timing indicator can serve to indicating the timing offset for both HARQ ACK/NACK and AP-CSI, whereby the HARQ ACK/NACK and AP-CSI are multiplexed in the PUCCH resource. In comparison, when the DCI 500 does not schedule PDSCH data reception, the PDSCH-to-HARQ_feedback timing indicator can the timing offset for AP-CSI only.

In yet another example, the PUCCH field 540 can include a timing offset field added to the DCI 500 specifically to indicate the timing offset for AP-CSI only. In this example, a table (or some other data structure) can be stored by the UE based on a technical specification or on RRC signaling. Entries in the table (or the data structure) can associate a bit value of this field with the timing offset to use. Accordingly, the UE can determine the bit value from timing offset field and use this value in a look-up of the entries to identify the timing offset. When the DCI 500 schedules PSDCH data reception, the looked up entries may have been defined via RRC that configures dl-DataToUL-ACK in a PUCCH-Config. In this situation, the entries for the HARQ ACK/NACK can be reused. When the DCI 500 does not schedule PSDCH data reception, the looked up entries may have been defined via RRC that configures reportSlotOffsetList in a CSI-ReportConfig. In this situation, there may be more than one configured AP-CSI reports and the timing offsets may vary between them. If so, the maximum indexed offset can be used.

When the DCI 500 triggers the UE to send an AP-CSI report(s) on a PUCCH, a constraint may exist on this sending. For example, the constraint can relate to a payload size limit on the PUCCH, where the number of available payload bits can depend on the PUCCH format. In this example, the constraint includes a maximum number of CSI reports (e.g., reduced from sixteen to a smaller number such eight, four, two, or one), a quantity limitation per CSI report (e.g., the UE to report only a layer-1 reference signal received power (L1-RSRP) and/or CSI-CRS Resource indicator (CRI)-RI-PMI-CQI), a codebook limitation (e.g., the UE to use multiple input multiple output (MIMO) Type I codebook), or a wideband PMI reporting configuration or a CQI reporting configuration (e.g., PUCCH reporting type 2, 2a, 2b, 2c, 4).

Although AP-CSI reporting on PUCCH is described herein above, variations exist. For example, the DCI 500 can trigger the AP-CSI reporting on a PUSCH. In this case, changes may be made to the DCI 500 to enable the triggering using a DL DCI (e.g., based on a format 1_1 or format 1_2) and the reporting on PUSCH. These changes relate to identifying the PUSCH resource(s) to use, the scheduling of the PUSCH resource, and the like. For instance, rather than having a DCI field 540, the DCI 500 can include a PUSCH field to indicate a PUSCH resource to use and a timing offset.

In another example of the variations, no AP-CSI report is sent (on PUCCH or PUSCH). Instead, the DCI 500 triggers AP-CSI without reporting measured quantities or measurement indicators to the network. For instance, RRC signaling is used to configure the UE to perform AP-TRS and/or an FR2 P3 procedure. In the former case, an aperiodic non-zero power CSI reference signal resource set (e.g., NZP-CSI-RS-ResourceSet) is configured via RRC with its TRS information set to true (e.g., "trs-info"="true"). In the latter case, an aperiodic non-zero power CSI reference signal resource set (e.g., NZP-CSI-RS-ResourceSet) is configured via RRC with its repetition set to ON (e.g., "repetition"="on"). In both cases, the RRC signaling configures the UE to perform AP-CSI-related measurements (e.g., AP-TRS and/or beam refinement measurements) on reference signals. The measurements, however, are not reported to the network. In this example, the DCI 500 may not include a PUCCH field 540 because not reporting is needed.

The DCI 500 can also indicate timing information for reference signals (e.g., AP-CSI-RS) to measure for the creation an AP CSI report(s). The CSI-RS timing field 550 can be added to the DCI 500 (e.g., DCI format 1_1 or 1_2) for this purpose. In an example, the CSI-RS timing field 550 can dynamically indicate the timing location of the AP-CSI-RS. The timing location may be defined as a function of slots or symbols within one or more slots. Alternatively, the CSI-RS timing field 550 is not included in the DCI 500. Instead, RRC signaling can configure the UE with the time location. For instance, aperiodicTriggeringOffset in NZP-CSI-RS-ResourceSet can be configured via RRC. The RRC configuration can lower the overhead, whereas the use of the CSI-RS timing field 550 can provide more scheduling flexibility.

Regardless of which field(s) 510 through 550 are used in the DCI 500, the DCI 500 may also schedule PDSCH data reception. In this situation, rate matching of PDSCH around AP-CSI-RS may be possible. In one approach, the UE is not expected to rate match PDSCH around the AP-CSI-RS even when the DCI 500 is used for AP-CSI triggering and PDSCH data reception scheduling. In another approach, rate matching may be performed. For instance, the rate matching is performed only if the DCI 500 is used for AP-CSI triggering and PDSCH data reception scheduling. Here, different types of rate matching are possible. In one example, the rate matching uses an AP-CSI-RS resource element (RE) and a PDSCH data RE, but no PDSCH DMRS RE. In another example, the rate matching uses an AP-CSI-RS RE and a PDSCH DMRS RE, but no PDSCH data RE. In yet another example, the rate matching uses an AP-CSI-RS RE, a PDSCH data RE, and a PDSCH DMRS RE.

Figure 6:
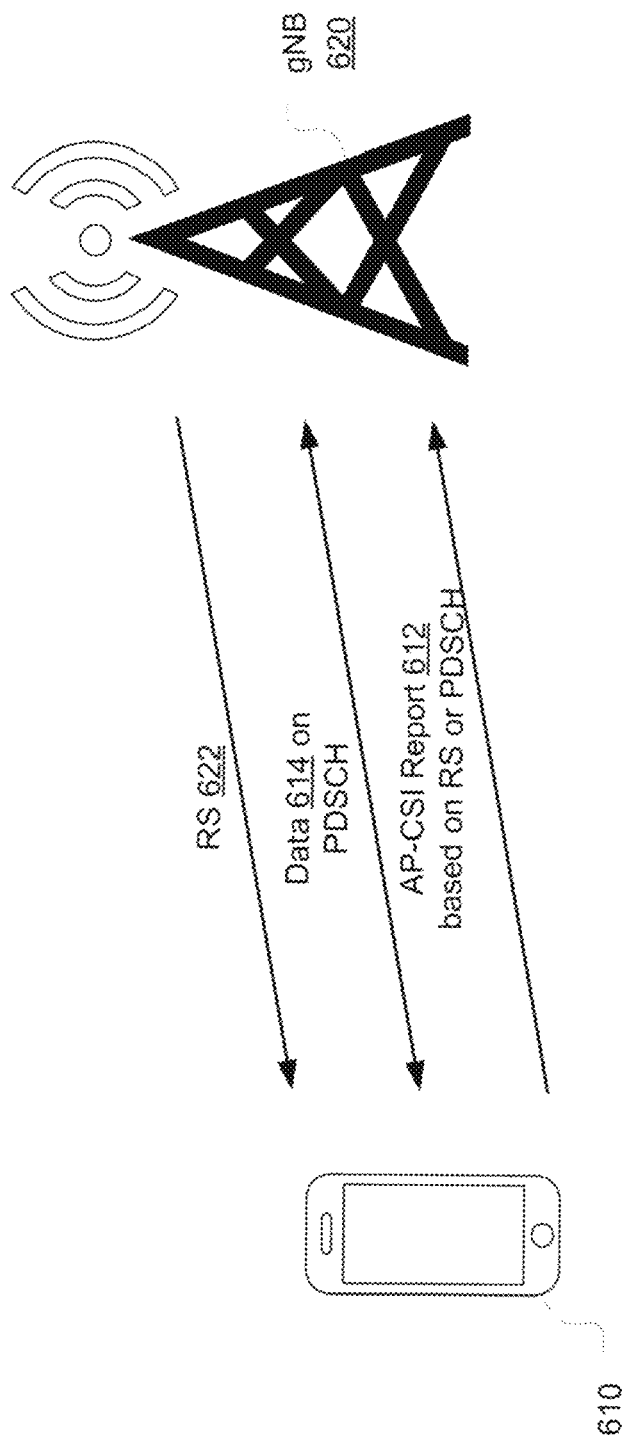
FIG. 6 illustrates an example of signals usable to generate an AP-CSI report, in accordance with some embodiments.

FIG. 6 illustrates an example of signals usable to generate an AP-CSI report, in accordance with some embodiments. In the illustration, a UE 610, similar to the UE 210 of FIG. 2, communicates with a gNB 620, similar to the gNB 220 of FIG. 2, using multiple channels, including a PDSCH and a PUCCH. As described herein above, the gNB 620 can trigger the UE 610 to send an AP-CSI report 612 (e.g., on the PUCCH), where a DL DCI is used (not illustrated in FIG. 6) for triggering the AP-CSI reporting and for scheduling data reception on a PDSCH. To generate the AP-CSI report, the UE 610 performs measurements and include information about such measurements in the AP-CSI report according to the CSI configuration (e.g., trigger state) triggered by the DL DCI. These measurements can be on reference signals 622 sent from the gNB 220 (and/or other network nodes). Additionally or alternatively, the measurements may not relate to the reference signals 622 and may instead relate to data 614 sent to the UE on the PDSCH.

In an example, RRC signaling can be used to configure the type of measurement to be reported in the AP-CSI report. If the measurements are to be performed on the reference signals, these reference signals 220 can include any or a combination of a NZP-CSI-RS, a CSI interference measurement (CSI-IM) signal, or an SSB signal. Otherwise, the RRC signaling can indicate whether the measurements relate to PDSCH data decoding performance (e.g., the decoding of the data 614 received on the PDSCH) and/or to PDSCH DMRS.

When the PDSCH decoding is used as the reference to derive the AP-CSI report, soft NACK information and/or soft ACK information can be included in the AP-CSI report 612. In particular, the UE 610 can receive the data 614, but the decoding of the data 614 may fail for a number of data retransmissions (e.g., repetitions), whereby the UE 610 may send a NACK and the gNB 620 may retransmit the data 614 on the PDSCH. If so, the soft NACK may provide more information to the gNB 620 about the accumulated energy associated with, for instance, the received signal(s) that encode the data 614. In one example, the soft NACK includes a quantized value that can be reported on the accumulated soft information across the different retransmissions (e.g., 0%, 25%, 50%, 75% or some other quantized values indicating a successfully decoded portion of the data 614 or, conversely, a failed decoded portion of the data 614). In another example, the soft NACK can include an estimated number of additional repetitions for successful decoding (e.g., one, two, four, eight, or some other value indicating the number of data retransmissions that the UE 610 expects before the UE 610 can successfully decode the entire data 614).

The soft ACK information may provide similar information, except from the perspective of a successful decoding of the data 614. The soft ACK information can be included in the AP-CSI report 612 upon the successful decoding of the data 614. In this case, the soft ACK information can be reported to provide more information to the gNB 620 about the overly used resources (e.g., the resources that were additionally used but were not necessary for the successful decoding). In one example, the soft ACK information includes a quantized value about the overlay used resources (e.g., 0%, 25%, 50%, 75% or some other quantized values indicating a number of retransmissions that were not needed for the successful decoding). In another example, if PDSCH repetition is used, the soft ACK information can indicate the actual repetition number that the UE 610 used to decode the data 614.

As described in connection with FIG. 5, the transmission of the AP-CSI report 612 (e.g., of the information included therein) can be multiplexed with the HARQ ACK/NACK transmission. In the examples of FIG. 6, the soft NACK information can be multiplexed with the NACK information and the soft ACK information can be multiplexed with the ACK information, as applicable.

Further, when PDSCH repetition is scheduled, the UE 610 can report early ACK before the gNB 620 finishes all PDSCH repetitions. In this case, the gNB 620 can configure (e.g., via RRC signaling) an additional PUCCH resource for the early reporting of the ACK. Soft ACK information can be sent (e.g., multiplexed with the ACK information) in this additional PUCCH resource.

When the PDSCH DMRS is used as the reference to derive the AP-CSI report 612, RI/LI/PMI reporting, CQI reporting, sub-band reporting, and/or wideband reporting can be included in the AP-CSI report 612. RI, LI, and PMI can be measured based on channel estimate(s) from the DMRS. Accordingly, the AP-CSI report 612 can include any or a combination of RI, LI, and PMI. In this case, the gNB 620 can indicate a precoder used for the DMR transmission with respect to CSI-RS. If so, joint DMRS and CSI-RS can be used for the RI, LI, and/or PMI computations. In other words, such computations can be derived from measurements on both the DMRS and the CSI-RS (e.g., included in the reference signals 622). The CQI reporting may involve a power offset with respect to the PDSCH. In this case, the DMRS power can be assumed (e.g., a "0 dB" power offset to the PDSCH is assumed). Alternatively, the power offset of the DMRS to the PDSCH can be configured via RRC signaling (e.g., to a value of "+/−3 dB"). Or, this power offset can be defined in a technical specification and stored in a memory of the UE 610 based on the technical specification's definition. DMRS can be sent on a set of sub-bands. Sub-band reporting in the AP-CSI report 612 is possible but may be limited to the sub-band overlap(s) between the DMRS and the scheduled PDSCH. Alternatively, wideband reporting can be used.

Figure 7:
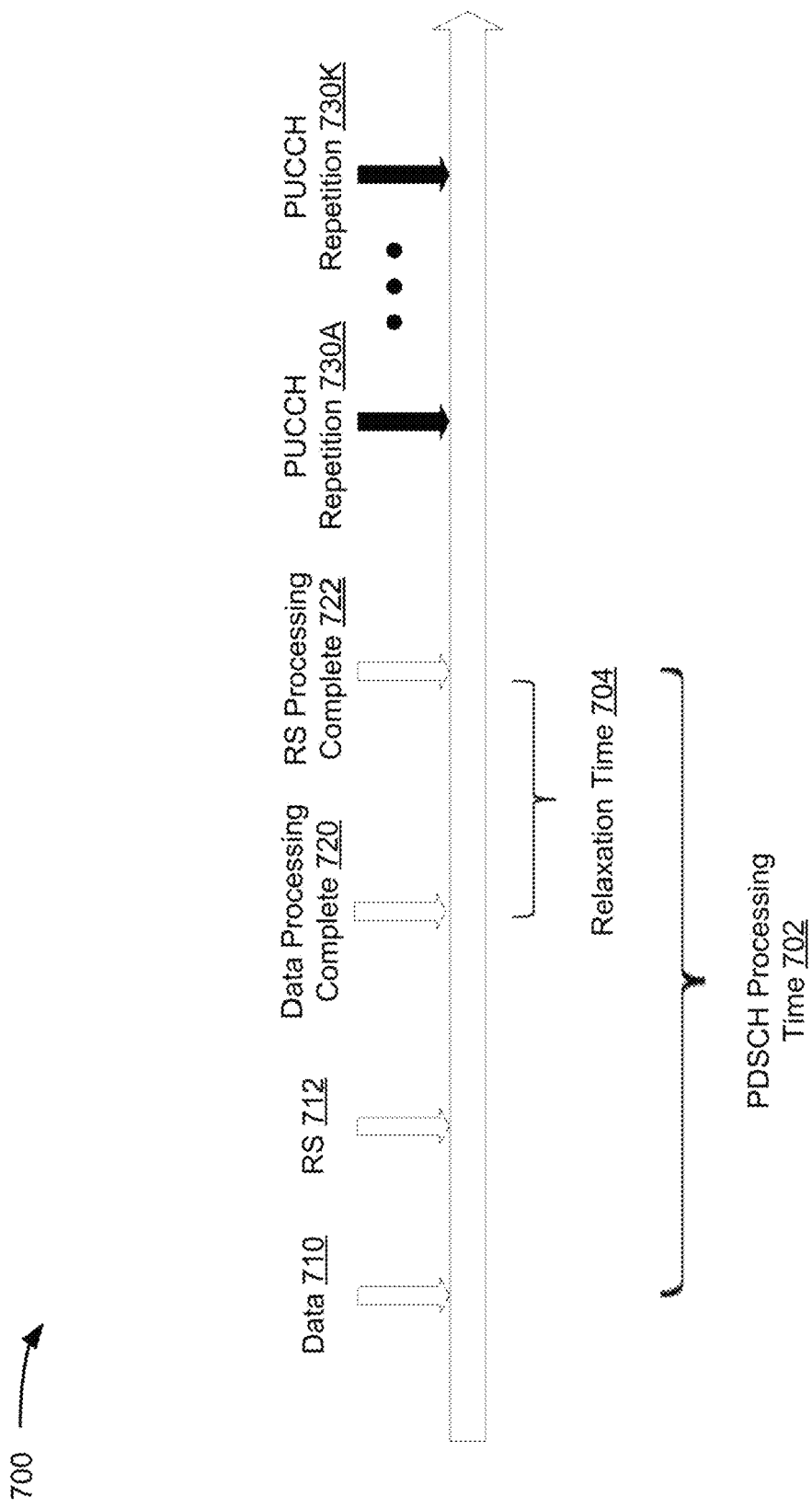
FIG. 7 illustrates an example of a timeline for sending an AP-CSI report, in accordance with some embodiments.

FIG. 7 illustrates an example of a timeline 700 for sending an AP-CSI report, in accordance with some embodiments. As described herein above, a DL DCI can schedule PDSCH data reception and can trigger AP-CSI reporting. The PDSCH decoding may necessitate a certain processing time, referred to as a PDSCH processing time 702 during which the UE is expected to receive and process the data sent on the PDSCH. Because AP-CSI is to be also reported, the PDSCH processing time 702 may be relaxed (e.g., its time length made longer) to allow for at least the processing of a reference signal(s) (e.g., CSI-RS, CSI-IM, SSB, TRS, and the like) that the UE is expected to receive and process. The relaxation may be by a factor "K", whereby the PDSCH processing time 702 is not relaxed (e.g., "K" is set to "1") when the DL DCI does not trigger the AP-CSI reporting, and whereby the PDSCH processing time 702 is relaxed (e.g., "K" set to a positive value larger than "1," such as to "1.5") when the DL DCI triggers the AP-CSI reporting to allow for the additional time needed for the reference signal processing. In other words, the PDSCH processing time 702 is variable and is made longer when the DL DCI is used for both PDSCH scheduling and AP-CSI triggering.

In the illustration of FIG. 7, the UE receives data at a first time (e.g., in a set of resource elements including symbols in the time domain) and a reference signal(s) 712 at a second time (e.g., also in a set of resource elements including symbols in the time domain). The UE completes the processing 720 of the data 710 at a third time (at which point, an ACK can be sent or, if the processing fails, a NACK can be sent). The UE also complete the processing 722 of the reference signal(s) 712 at a fourth time. The difference between the fourth time and the first time needs to be within the PDSCH processing time 702. The difference between the fourth time and the third time corresponds to a relaxation time 704, which is the time by which the PDSCH processing time 702 has been relaxed relative because of the simultaneous DL DCI-based PDSCH scheduling and AP-CSI triggering.

In an example, the PDSCH processing time 702 is defined in a table(s) of a technical specification and can depend on the PDSCH processing capability of the UE (e.g., "capability 1" and "capability 2," where the PDSCH processing time 702 is generally shorter with "capability 2"). The table(s) can also include the relaxation factor "K," where the values of "K" can depend on the need to relax the PDSCH processing time 702 or not (e.g., "K=1" when the DL DCI does not trigger the AP-CSI reporting, "K=1" when the DL DCI triggers the AP-CSI reporting but does not schedule PDSCH, and "K=1.5" when the DL DCI triggers the AP-CSI reporting and schedules PDSCH). Additionally or alternatively, upon being configured via RRC for AP-CSI reporting (e.g., depending on the number of trigger states and the number of AP-CSI report per trigger state), the UE can estimate the needed relaxation time 704 and can report this relaxation time 704 and/or a value of the relaxation factor "K" to the network. For instance, the UE can execute logic that estimates the relaxation time 704 based on the UE's processing capability, the trigger states, the number of CSI reports per trigger states, the CSI-report types, the amount and type of measurements, and/or other CSI-related factors. The logic can also include defined relaxation time ranges, each associated with a value of the relaxation factor "K." By determining that the estimated relaxation time 704 falls within a particular relaxation time range, the logic identifies the corresponding "K" value. This value is then reported in UE capability signaling to the network.

Additionally, when AP-CSI is triggered by DL DCI on PUCCH, PUCCH repetition can be also scheduled. If the PUCCH repetition is scheduled, different transmission opportunities exist to report the AP-CSI. These transmission opportunities are illustrated in FIG. 7 as PUCCH repetitions 730A through 730K. In one example, to meet the PDSCH processing time 702, the second to last PUCCH repetition or the last PUCCH repetition is used to send an AP-CSI report. In another example, to reduce latency in the reporting, the first PUCCH repetition is used or, alternatively, the first PUCCH repetition that meets the PDSCH processing time 702 is used (e.g., the first scheduled one that falls after the end of the PDSCH processing time 702). In yet another example, all PUCCH repetitions are used such that each can send the AP-CSI report. In this example, the reporting latency can be reduced. Alternatively in this example, all PUCCH repetitions that meet the PDSCH processing time 702 are used (e.g., all the scheduled ones falling after the end of the PDSCH processing time 702). In these various examples, RRC signaling can configure the UE to use the applicable PUCCH repetition(s). This RRC configuration can be part of the CSI configuration.

Figure 8:
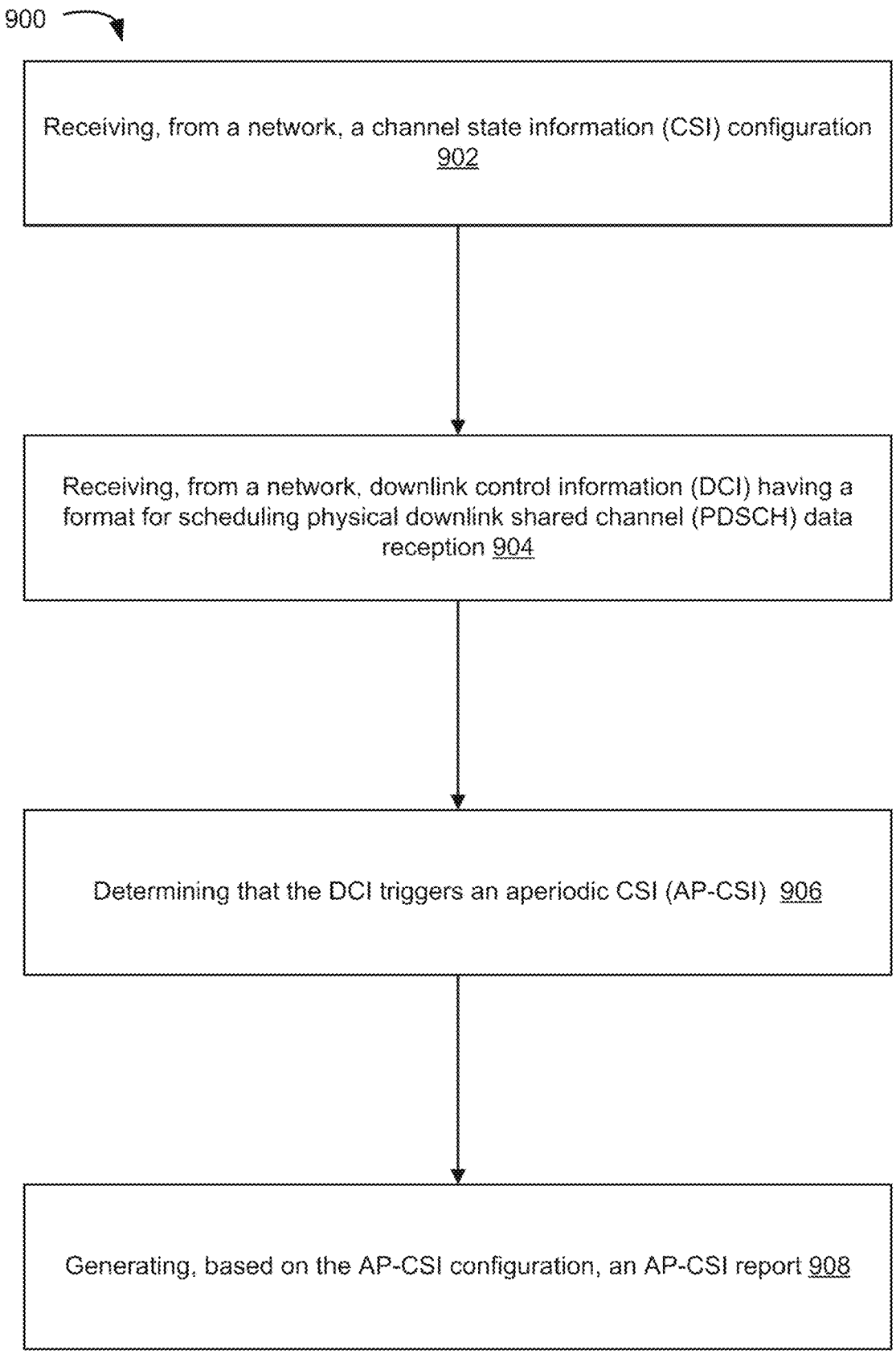
FIG. 8 illustrates an example of an operational flow/algorithmic structure for a UE using a DCI-based trigger for AP-CSI reporting, in accordance with some embodiments.

FIG. 8 illustrates an example of an operational flow/algorithmic structure 800 for a UE using a DCI-based trigger for AP-CSI reporting, in accordance with some embodiments. The operation flow/algorithmic structure 800 may be performed or implemented by the UE such as, for example, the UE 104, 210, 310, 410, 610, 1100, or components thereof, for example, processors 1104. The UE can communicate with a network (e.g., network nodes including, for instance, gNBs and/or eNBs) using a plurality of channels.

The operation flow/algorithmic structure 800 may include, at 802, receiving, from the network, a CSI configuration. For example, the CSI configuration is for AP-CSI reporting and is received in RRC signaling. The RRC signaling can indicate a number of trigger states (e.g., one-hundred twenty-eight) and a number of associated AP-CSI reports per trigger states (e.g., up to sixteen). Additional RRC signaling or MAC CE signaling can be received from the network to activate a subset of the trigger states.

The operation flow/algorithmic structure 800 may include, at 804, receiving, from the network, DCI having a format for scheduling PDSCH data reception. For example, the DCI is DL DCI, such as DCI format 1_1 or 1_2. This DCI can actually schedule the PDSCH data reception or may be usable but, in fact, not schedule the PDSCH data reception. The DCI can include one or more fields for triggering AP-CSI reporting. The DCI can also include one or more fields for providing trigger state-related information, PUCCH-related information, and/or reference signal-related information.

The operation flow/algorithmic structure 800 may include, at 806, determining that the DCI triggers an AP-CSI. For example, the trigger is determined based on a bit value(s) in one or more fields of the DCI.

The operation flow/algorithmic structure 800 may include, at 808, generating, based on the CSI configuration, an AP-CSI report. For example, the bit value(s) can indicate a particular trigger state, or only one trigger state may have been configured and/or activated for the UE. The trigger state may be associated with one or more AP-CSI reports. The UE receives reference signals and performs measurements according to the configuration(s) of the AP-CSI report(s). A generated AP-CSI report can be sent on PUCCH (in a PUCCH resource in one or more PUCCH repetitions). Additionally or alternatively, the UE may be configured to perform an AP-CSI measurement (e.g., based on TRS or FR2 P3 procedure), and this measurement need not be reported to the network.

Figure 9:
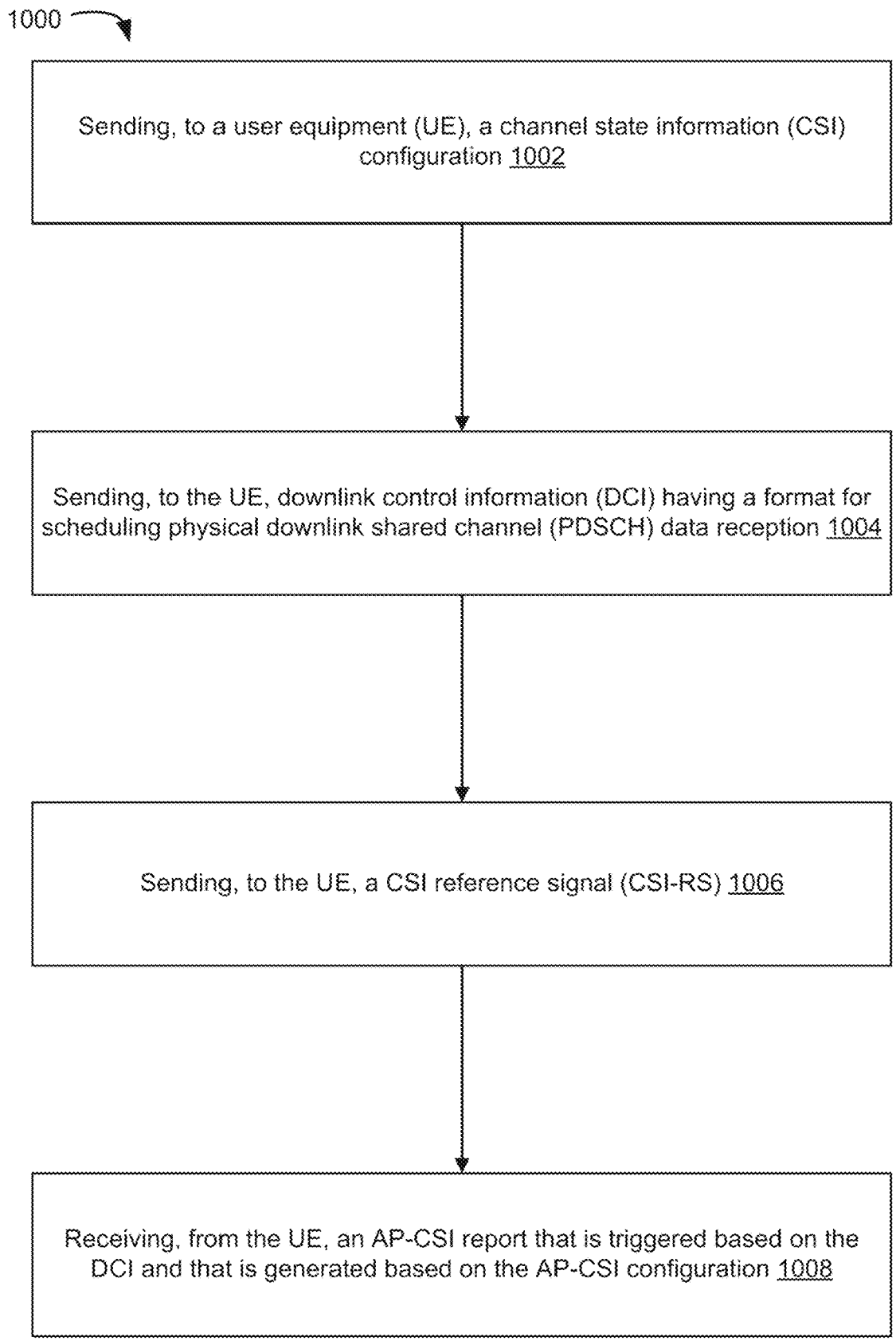
FIG. 9 illustrates an example of an operational flow/algorithmic structure for a network node using a DCI-based trigger for AP-CSI reporting, in accordance with some embodiments.

FIG. 9 illustrates an example of an operational flow/algorithmic structure 900 for a network node using a DCI-based trigger for AP-CSI reporting, in accordance with some embodiments. The operation flow/algorithmic structure 700 may be performed or implemented by the network node such as, for example, the gNB 108, the network node 220, the network node 320, the network node 420, the network 62, the gNB 1200 or components thereof, for example, processors 1204, a base station of a different type, or a radio network core. The UE can communicate with a network that includes the network node using multiple channels.

The operation flow/algorithmic structure 900 may include, at 902, sending, to the UE, a CSI configuration. For example, the CSI configuration is for AP-CSI reporting and is sent in RRC signaling. The RRC signaling can indicate a number of trigger states (e.g., one-hundred twenty-eight) and a number of associated AP-CSI reports per trigger states (e.g., up to sixteen). Additional RRC signaling or MAC CE signaling can be sent to the UE to activate a subset of the trigger states.

The operation flow/algorithmic structure 900 may include, at 904, sending, to the UE, DCI having a format for scheduling PDSCH data reception. For example, the DCI is DL DCI, such as DCI format 1_1 or 1_2. This DCI can actually schedule the PDSCH data reception or may be usable but in fact not schedule the PDSCH data reception. The DCI can include one or more fields for triggering AP-CSI reporting. The DCI can also include one or more fields for providing trigger state-related information, PUCCH-related information, and/or reference signal-related information.

The operation flow/algorithmic structure 900 may include, at 906, sending, to the UE, a CSI reference signal (e.g., CSI-RS). The CSI-reference signal can be used by the UE to perform measurement and generate an AP-CSI.

The operation flow/algorithmic structure 900 may include, at 908, receiving, from the UE, an AP-CSI report that is triggered based on the DCI and that is generated based on the AP-CSI configuration. For example, the UE can perform the measurements on the CSI reference signal and can generate the AP-CSI report. This report can be received over PUCCH (in a PUCCH resource in one or more PUCCH repetitions).

Figure 10:
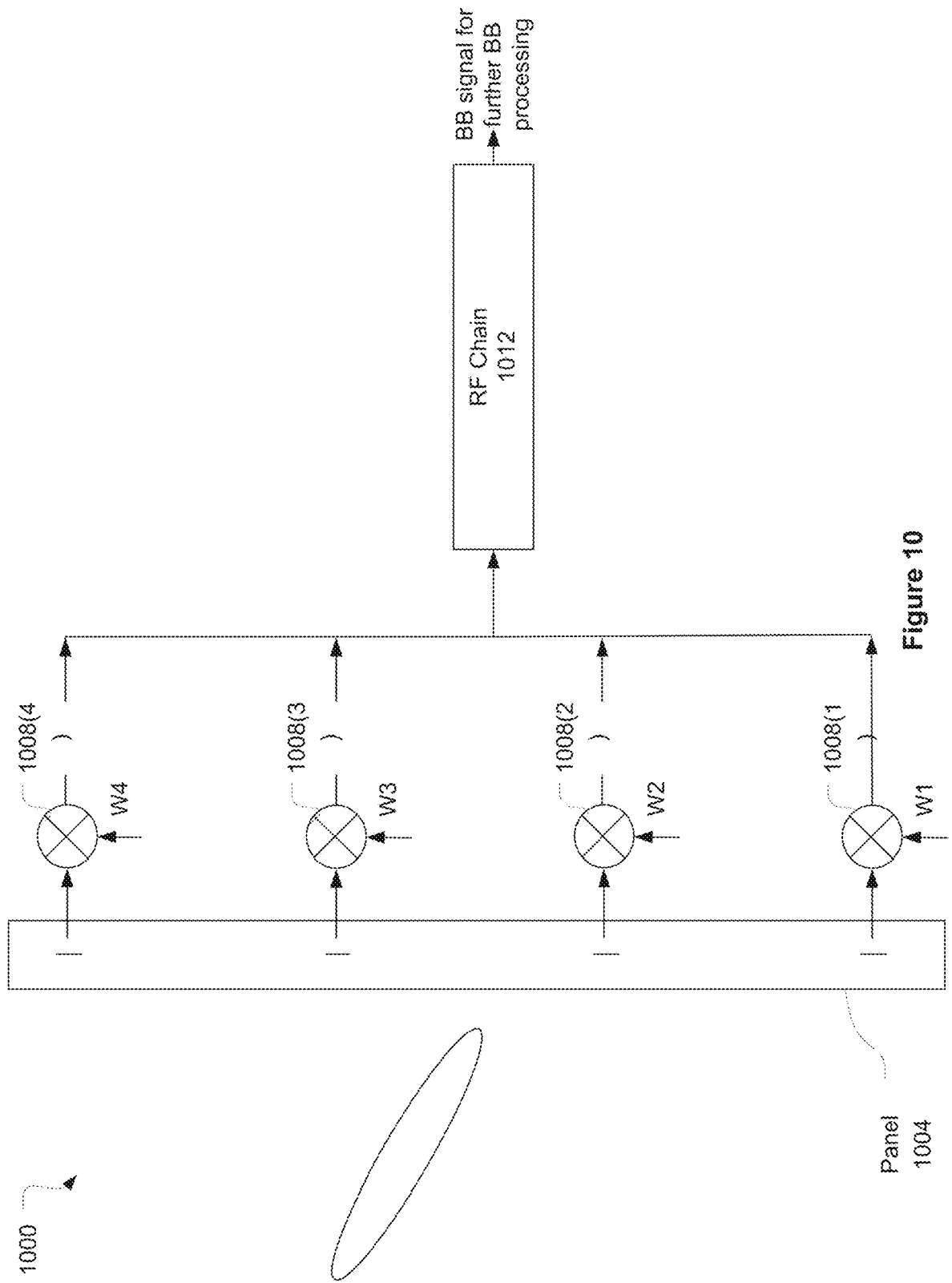
FIG. 10 illustrates an example of receive components, in accordance with some embodiments.

FIG. 10 illustrates receive components 1000 of the UE 104 in accordance with some embodiments. The receive components 1000 may include an antenna panel 1004 that includes a number of antenna elements. The panel 1004 is shown with four antenna elements, but other embodiments may include other numbers.

The antenna panel 1004 may be coupled to analog beamforming (BF) components that include a number of phase shifters 1008(1)-1008(4). The phase shifters 1008(1)-1008(4) may be coupled with a radio-frequency (RF) chain 1012. The RF chain 1012 may amplify a receive analog RF signal, down-convert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 1008(1)-1008(4) to provide a receive beam at the antenna panel 1004. These BF weights may be determined based on the channel-based beamforming.

Figure 11:
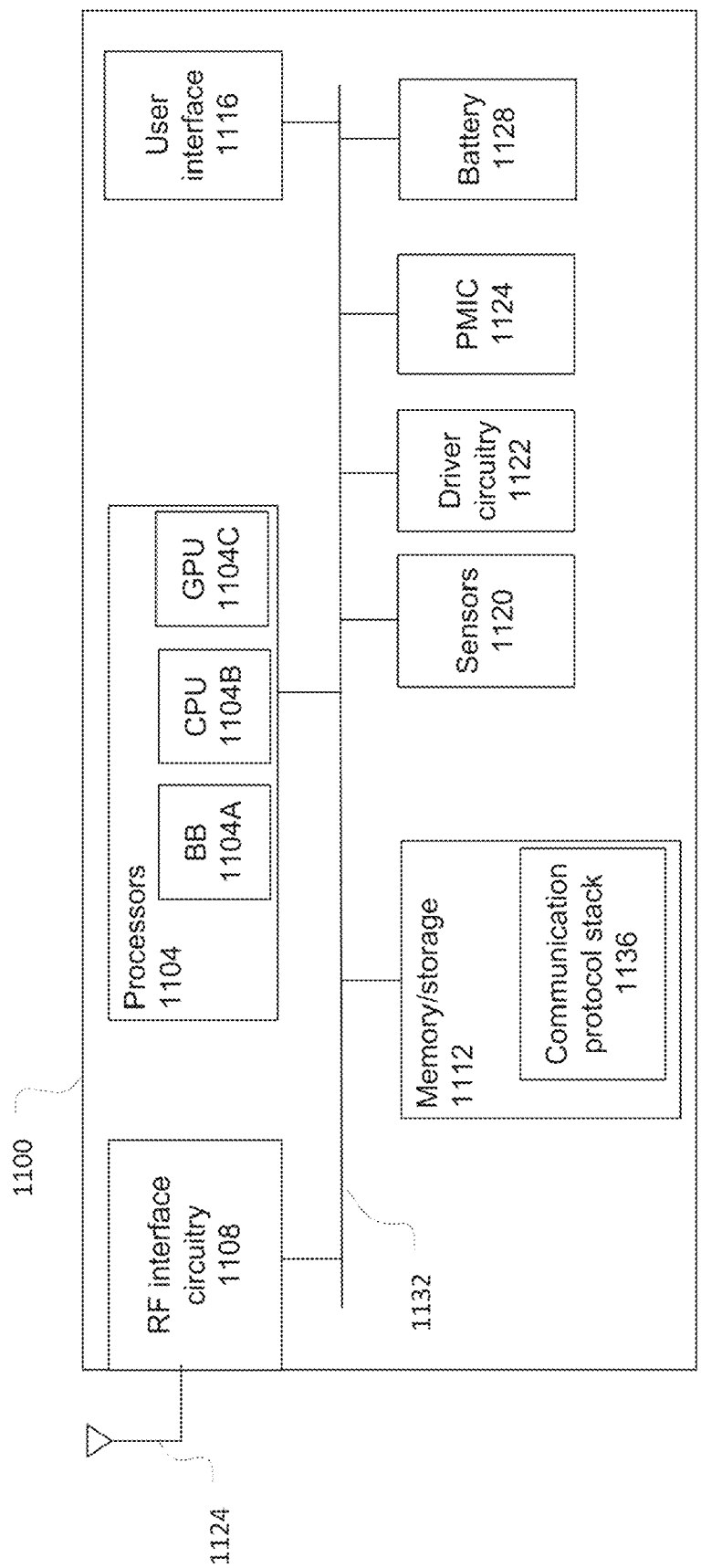
FIG. 11 illustrates an example of a UE, in accordance with some embodiments.

FIG. 11 illustrates a UE 1100 in accordance with some embodiments. The UE 1100 may be similar to and substantially interchangeable with UE 104 of FIG. 1.

Similar to that described above with respect to UE 104, the UE 1100 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 1100 may include processors 1104, RF interface circuitry 1108, memory/storage 1112, user interface 1116, sensors 1120, driver circuitry 1122, power management integrated circuit (PMIC) 1124, and battery 1128. The components of the UE 1100 may be implemented as integrated circuits (ICs), portions thereof, discrete electronic devices, or other modules, logic, hardware, software, firmware, or a combination thereof. The block diagram of FIG. 11 is intended to show a high-level view of some of the components of the UE 1100. However, some of the components shown may be omitted, additional components may be present, and different arrangements of the components shown may occur in other implementations.

The components of the UE 1100 may be coupled with various other components over one or more interconnects 1132, which may represent any type of interface, input/output, bus (local, system, or expansion), transmission line, trace, optical connection, etc. that allows various circuit components (on common or different chips or chipsets) to interact with one another.

The processors 1104 may include processor circuitry such as, for example, baseband processor circuitry (BB) 1104A, central processor unit circuitry (CPU) 1104B, and graphics processor unit circuitry (GPU) 1104C. The processors 1104 may include any type of circuitry or processor circuitry that executes or otherwise operates computer-executable instructions, such as program code, software modules, or functional processes from memory/storage 1112 to cause the UE 1100 to perform operations as described herein.

In some embodiments, the baseband processor circuitry 1104A may access a communication protocol stack 1136 in the memory/storage 1112 to communicate over a 3GPP compatible network. In general, the baseband processor circuitry 1104A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1108.

The baseband processor circuitry 1104A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 1104A may also access group information 1124 from memory/storage 1112 to determine search space groups in which a number of repetitions of a PDCCH may be transmitted.

The memory/storage 1112 may include any type of volatile or non-volatile memory that may be distributed throughout the UE 1100. In some embodiments, some of the memory/storage 1112 may be located on the processors 1104 themselves (for example, L1 and L2 cache), while other memory/storage 1112 is external to the processors 1104 but accessible thereto via a memory interface. The memory/storage 1112 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1108 may include transceiver circuitry and a radio frequency front module (RFEM) that allows the UE 1100 to communicate with other devices over a radio access network. The RF interface circuitry 1108 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1124 and proceed to filter and amplify (with a low-noise amplifier) the signal. The signal may be provided to a receiver of the transceiver that down-converts the RF signal into a baseband signal that is provided to the baseband processor of the processors 1104.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1124.

In various embodiments, the RF interface circuitry 1108 may be configured to transmit/receive signals in a manner compatible with NR access technologies.

The antenna 1124 may include a number of antenna elements that each convert electrical signals into radio waves to travel through the air and to convert received radio waves into electrical signals. The antenna elements may be arranged into one or more antenna panels. The antenna 1124 may have antenna panels that are omnidirectional, directional, or a combination thereof to enable beamforming and multiple input, multiple output communications. The antenna 1124 may include microstrip antennas, printed antennas fabricated on the surface of one or more printed circuit boards, patch antennas, phased array antennas, etc. The antenna 1124 may have one or more panels designed for specific frequency bands including bands in FR1 or FR2.

The user interface circuitry 1116 includes various input/output (I/O) devices designed to enable user interaction with the UE 1100. The user interface 1116 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1100.

The sensors 1120 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1122 may include software and hardware elements that operate to control particular devices that are embedded in the UE 1100, attached to the UE 1100, or otherwise communicatively coupled with the UE 1100. The driver circuitry 1122 may include individual drivers allowing other components to interact with or control various input/output (I/O) devices that may be present within, or connected to, the UE 1100. For example, driver circuitry 1122 may include a display driver to control and allow access to a display device, a touchscreen driver to control and allow access to a touchscreen interface, sensor drivers to obtain sensor readings of sensor circuitry 1120 and control and allow access to sensor circuitry 1120, drivers to obtain actuator positions of electro-mechanic components or control and allow access to the electro-mechanic components, a camera driver to control and allow access to an embedded image capture device, audio drivers to control and allow access to one or more audio devices.

The PMIC 1124 may manage power provided to various components of the UE 1100. In particular, with respect to the processors 1104, the PMIC 1124 may control power-source selection, voltage scaling, battery charging, or DC-to-DC conversion.

In some embodiments, the PMIC 1124 may control, or otherwise be part of, various power saving mechanisms of the UE 1100. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1100 may power down for brief intervals of time and thus save power. If there is no data traffic activity for an extended period of time, then the UE 1100 may transition off to an RRC_Idle state, where it disconnects from the network and does not perform operations such as channel quality feedback, handover, etc. The UE 1100 goes into a very low power state and it performs paging where again it periodically wakes up to listen to the network and then powers down again. The UE 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1128 may power the UE 1100, although in some examples the UE 1100 may be mounted deployed in a fixed location, and may have a power supply coupled to an electrical grid. The battery 1128 may be a lithium ion battery, a metal-air battery, such as a zinc-air battery, an aluminum-air battery, a lithium-air battery, and the like. In some implementations, such as in vehicle-based applications, the battery 1128 may be a typical lead-acid automotive battery.

Figure 12:
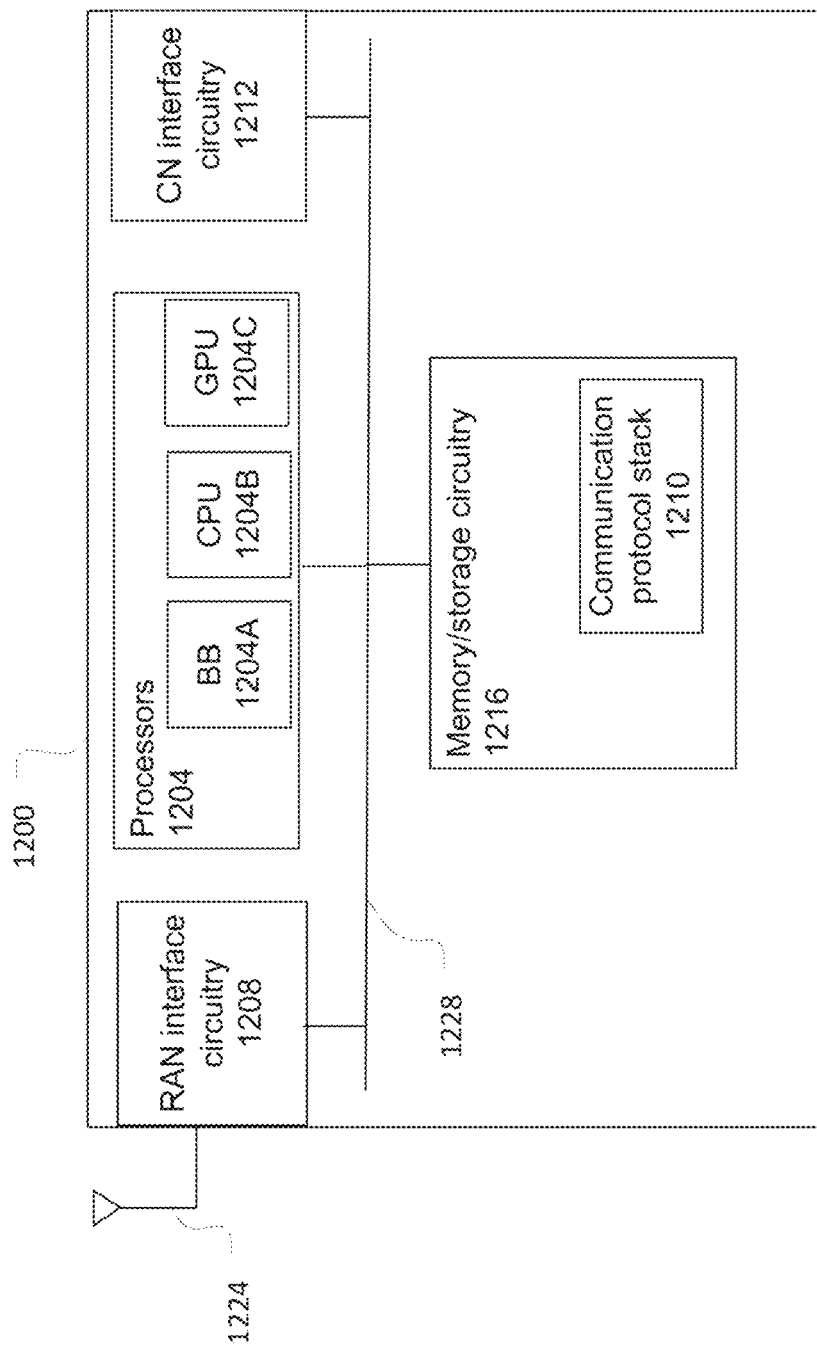
FIG. 12 illustrates an example of a base station, in accordance with some embodiments.

FIG. 12 illustrates a gNB 1200 in accordance with some embodiments. The gNB node 1200 may be similar to and substantially interchangeable with gNB 108. A base station, such as the base station 112, can have the same or similar components as the gNB 1200.

The gNB 1200 may include processors 1204, RF interface circuitry 1208, core network (CN) interface circuitry 1212, and memory/storage circuitry 1216.

The components of the gNB 1200 may be coupled with various other components over one or more interconnects 1228.

The processors 1204, RF interface circuitry 1208, memory/storage circuitry 1216 (including communication protocol stack 1210), antenna 1224, and interconnects 1228 may be similar to like-named elements shown and described with respect to FIG. 10.

The CN interface circuitry 1212 may provide connectivity to a core network, for example, a 5$^{th}$ Generation Core network (5GC) using a 5GC-compatible network interface protocol such as carrier Ethernet protocols, or some other suitable protocol. Network connectivity may be provided to/from the gNB 1200 via a fiber optic or wireless backhaul. The CN interface circuitry 1212 may include one or more dedicated processors or FPGAs to communicate using one or more of the aforementioned protocols. In some implementations, the CN interface circuitry 1212 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method. The method is implemented on a user equipment (UE). The method comprises: receiving, from a network, a channel state information (CSI) configuration; receiving, from the network, downlink control information (DCI) having a format for scheduling physical downlink shared channel (PDSCH) data reception; determining that the DCI triggers an aperiodic-CSI (AP-CSI); and generating, based on the CSI configuration, an AP-CSI report.

Example 2 includes a method of example 1, further comprising: sending, to the network, the AP-CSI report on a physical uplink control channel (PUCCH).

Example 3 includes a method of example 1, wherein the CSI configuration configures the UE to perform an AP-CSI measurement for at least one of aperiodic timing and frequency tracking or beam measurement, and wherein the AP-CSI measurement is generated by the UE based on the DCI but not sent to the network.

Example 4 includes a method of any preceding examples 1-3, wherein the format of the DCI is format 1_1 or 1_2 and the DCI includes a CSI request field that triggers AP-CSI reporting.

Example 5 includes a method of example 4, further comprising: determining a CSI trigger state based on values of bits included in the CSI request field.

Example 6 includes a method of example 5, wherein the CSI configuration is received via first radio resource control (RRC) signaling that configures a plurality of CSI trigger states, and wherein the method further comprises: receiving, from the network, second RRC signaling or medium access control (MAC) control element (CE) signaling activating a subset of the plurality of CSI trigger states, wherein the CSI trigger state is identified from the subset based on the values of the bits included in the CSI request field.

Example 7 includes a method of any preceding examples 1-6, wherein the format of the DCI is format 1_1 or 1_2, and wherein a cyclic redundancy check (CRC) of the DCI is scrambled with a radio network temporary identifier (RNTI) configured for triggering AP-CSI reporting.

Example 8 includes a method of any preceding examples 1-7, wherein the format of the DCI is format 1_1 or 1_2, wherein the DCI includes one or more fields that have bit values that trigger AP-CSI reporting, and wherein the one or more fields include a frequency domain resource assignment field, a time domain resource assignment field, a virtual resource block to physical resource block mapping field, a physical resource block bundling size indicator field, a rate matching indicator field, a modulation and coding scheme field, a new data indicator field, a redundancy version field, a hybrid automatic repeat process number field, or an antenna port field.

Example 9 includes a method of any preceding examples 1-8, wherein the CSI configuration is received via radio resource control (RRC) signaling or medium access control (MAC) control element (CE) signaling indicating a semi-static configuration, and wherein the format of the DCI is format 1_1 or 1_2.

Example 10 includes a method of any preceding examples 1-9, wherein the DCI includes a CSI request field having a plurality of bits, wherein a value represented by the plurality of bits corresponds to an AP-CSI trigger state from a plurality of configured AP-CSI trigger states, wherein the AP-CSI trigger state is associated with one or more AP-CSI reports.

Example 11 includes a method of any preceding examples 1-10, wherein the CSI configuration is received via radio resource control (RRC) signaling or medium access control (MAC) control element (CE) signaling and incites an AP-CSI trigger state, and wherein the DCI includes a CSI request field that triggers AP-CSI reporting.

Example 12 includes a method of any preceding examples 1-11, further comprising: sending, to the network, the AP-CSI report on a physical uplink control channel (PUCCH), wherein the DCI indicates a PUCCH resource for AP-CSI reporting.

Example 13 includes a method of example 12, wherein the DCI further indicates a timing offset for the PUCCH resource.

Example 14 includes a method of example 13, wherein the DCI schedules data reception on a PDSCH, and wherein the timing offset is indicated in a DCI field that also indicates timing of a hybrid automatic repeat request feedback.

Example 15 includes a method of example 13, wherein the DCI includes a field that indicates only the timing offset of the PUCCH resource.

Example 16 includes a method of example 13, further comprising: determining, from the DCI, a look-up value; and determining the timing offset by using the look-up value in a look-up of timing offsets, wherein the timing offsets are configured via radio resource control (RRC) signaling for a hybrid automatic repeat request process or for a AP-CSI reporting.

Example 17 includes a method of any preceding examples 1-16, wherein the DCI includes a field that indicates only timing of an AP-CSI reference signal to measure.

Example 18 includes a method of any preceding examples 1-17, wherein the DCI schedules data reception on a PDSCH, and wherein the UE is configured to perform rate matching that uses an AP-CSI reference signal resource element and at least one of: a PDSCH data resource element or a PDSCH demodulation reference signal resource element.

Example 19 includes a method of any preceding examples 1-18, further comprising: sending, to the network, the AP-CSI report on a physical uplink control channel (PUCCH) based on a constraint, wherein the constraint includes a maximum number of CSI reports, a quantity limitation per CSI report, a codebook limitation, or a wideband pre-coding matrix indicator (PMI) reporting configuration, or a wideband channel quality indicator (CQI) reporting configuration.

Example 20 includes a method of any preceding examples 1-19, wherein the DCI has a format 1_1 or 1_2, wherein the AP-CSI report is generated based on a CSI-reference signal, a CSI-interference measurement (IM), or a synchronization signal block (SSB), and wherein the AP-CSI report is sent on a physical uplink control channel (PUCCH).

Example 21 includes a method of any preceding examples 1-20, wherein the DCI schedules data reception on a PDSCH, and wherein the AP-CSI report is generated based on a PDSCH decoding performance associated with the data reception.

Example 22 includes a method of example 21, wherein the AP-CSI report includes soft negative acknowledgement (NACK) information or soft acknowledgement (ACK) information, wherein the soft NACK information indicates accumulated soft information from a first number of retransmission repetitions or a second estimated number of retransmission repetitions for successful decoding, wherein the soft ACK information indicates overly used resources or a third number of retransmission repetitions used for the successful decoding.

Example 23 includes a method of example 22, wherein the AP-CSI report includes the soft ACK information and is sent before a retransmission repetition by the network.

Example 24 includes a method of any preceding examples 1-23, wherein the DCI schedules data reception on a PDSCH, and wherein the AP-CSI report is generated based on a PDSCH demodulation reference signal (DMRS) associated with the data reception.

Example 25 includes a method of example 24, wherein the AP-CSI report includes, based on a channel estimate from the DMRS, a rank indicator measurement, a layer indicator measurement, or a pre-coding matrix indicator measurement.

Example 26 includes a method of example 24, wherein the AP-CSI report includes a channel quality indicator measurement based on a DMRS to PDSCH power offset.

Example 27 includes a method of example 24, wherein the AP-CSI report includes (i) sub-band reporting for sub-bands that overlap between a pre-coding matrix indicator or a channel quality indicator configuration and the PDSCH, or (ii) wideband reporting.

Example 28 includes a method of any preceding examples 1-27, wherein the DCI schedules the PDSCH data reception, and wherein PDSCH processing time associated with the PDSCH data reception and AP-CSI reporting is relaxed by a factor based on the DCI scheduling the PDSCH data reception and triggering the AP-CSI report.

Example 29 includes a method of example 28, further comprising: sending, to the network, a value of the factor by which the PDSCH processing time is to be relaxed Example 30 includes a method of any preceding examples 1-29, further comprising: sending, to the network, the AP-CSI report on a physical uplink control channel (PUCCH), wherein the AP-CSI report is sent in one or more scheduled PUCCH repetitions.

Example 31 includes a method of any preceding examples 1-20, wherein the AP-CSI report is generated based on a CSI reference signal (CSI-RS) and within a CSI-RS processing time, and wherein the AP-CSI report is sent in all scheduled PUCCH repetitions having a timing occurring after the CSI-RS processing time.

Example 32 includes a method. The method is implemented by a network node. The method comprises: sending, to a user equipment (UE), a channel state information (CSI) configuration; sending, to the UE, downlink control information (DCI) having a format for scheduling physical downlink shared channel (PDSCH) data reception; sending, to the UE, a CSI reference signal (CSI-RS); and receiving, from the UE, an AP-CSI report that is triggered based on the DCI and that is generated based on the AP-CSI configuration.

Example 33 includes a method of example 32, wherein the DCI has a format 1_1 or 1_2, and wherein the AP-CSI report is sent on a physical uplink control channel (PUCCH).

Example 34 includes a method of any preceding examples 32-33, wherein the DCI schedules data reception on a PDSCH, and wherein the AP-CSI report is sent on a physical uplink control channel (PUCCH).

Example 35 includes a UE comprising means to perform one or more elements of a method described in or related to any of the examples 1-31.

Example 36 includes one or more computer-readable media comprising instructions to cause a UE, upon execution of the instructions by one or more processors of the UE, to perform one or more elements of a method described in or related to any of the examples 11-31.

Example 37 includes a UE comprising logic, modules, or circuitry to perform one or more elements of a method described in or related to any of the examples 1-31.

Example 38 includes a UE comprising: one or more processors and one or more computer-readable media comprising instructions that, when executed by the one or more processors, cause the one or more processors to perform one or more elements of a method described in or related to any of the examples 1-31.

Example 39 includes a system comprising means to perform one or more elements of a method described in or related to any of the examples 1-31.

Example 40 includes a network node comprising means to perform one or more elements of a method described in or related to any of the examples 32-34.

Example 41 includes one or more computer-readable media comprising instructions to cause a network node, upon execution of the instructions by one or more processors of the network node, to perform one or more elements of a method described in or related to any of the examples 32-34.

Example 42 includes a network node comprising logic, modules, or circuitry to perform one or more elements of a method described in or related to any of the examples 32-34.

Example 43 includes a network node comprising: one or more processors and one or more computer-readable media comprising instructions that, when executed by the one or more processors, cause the one or more processors to perform one or more elements of a method described in or related to any of the examples 32-34.

Example 44 includes a network node comprising means to perform one or more elements of a method described in or related to any of the examples 32-34.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method implemented by a user equipment (UE), the method comprising:
   receiving, from a network, a channel state information (CSI) configuration;
   receiving, from the network, downlink control information (DCI) having a format for scheduling physical downlink shared channel (PDSCH) data reception;
   determining that the DCI triggers an aperiodic-CSI (AP-CSI);
   generating, based on the CSI configuration, an AP-CSI report; and
   determining, from the DCI, a timing offset for a physical uplink control channel (PUCCH) resource associated with sending the AP-CSI report.

2. The method of claim 1, further comprising:
   sending, to the network, the AP-CSI report on a PUCCH.

3. The method of claim 1, wherein the CSI configuration configures the UE to perform an AP-CSI measurement for at least one of aperiodic timing and frequency tracking or beam measurement, and wherein the AP-CSI measurement is generated by the UE based on the DCI but not sent to the network.

4. The method of claim 1, wherein the format of the DCI is format 1_1 or 1_2 and the DCI includes a CSI request field that triggers AP-CSI reporting, wherein the method further comprises:
   determining a CSI trigger state based on values of bits included in the CSI request field.

5. The method of claim 4, wherein the CSI configuration is received via first radio resource control (RRC) signaling that configures a plurality of CSI trigger states, and wherein the method further comprises:
   receiving, from the network, second RRC signaling or medium access control (MAC) control element (CE) signaling activating a subset of the plurality of CSI trigger states, wherein the CSI trigger state is identified from the subset based on values of the bits included in the CSI request field.

6. The method of claim 1, wherein the format of the DCI is format 1_1 or 1_2, and wherein a cyclic redundancy check (CRC) of the DCI is scrambled with a radio network temporary identifier (RNTI) configured for triggering AP-CSI reporting.

7. The method of claim 1, wherein the format of the DCI is format 1_1 or 1_2, wherein the DCI includes one or more fields that have bit values that trigger AP-CSI reporting, and wherein the one or more fields include a frequency domain resource assignment field, a time domain resource assignment field, a virtual resource block to physical resource block mapping field, a physical resource block bundling size indicator field, a rate matching indicator field, a modulation and coding scheme field, a new data indicator field, a redundancy version field, a hybrid automatic repeat process number field, or an antenna port field.

8. The method of claim 1, wherein the CSI configuration is received via radio resource control (RRC) signaling or medium access control (MAC) control element (CE) signaling indicating a semi-static configuration, and wherein the format of the DCI is format 1_1 or 1_2.

9. The method of claim 8, wherein the DCI includes a CSI request field having a plurality of bits, wherein a value represented by the plurality of bits corresponds to an AP-CSI trigger state from a plurality of configured AP-CSI trigger states, wherein the AP-CSI trigger state is associated with one or more AP-CSI reports.

10. The method of claim 1, wherein the CSI configuration is received via radio resource control (RRC) signaling or medium access control (MAC) control element (CE) signaling and incites an AP-CSI trigger state, and wherein the DCI includes a CSI request field that triggers AP-CSI reporting.

11. The method of claim 1, further comprising:
    sending, to the network, the AP-CSI report on a PUCCH, wherein the DCI indicates the PUCCH resource for AP-CSI reporting, wherein the DCI schedules data reception on a PDSCH, and wherein the timing offset is indicated in a DCI field that also indicates timing of a hybrid automatic repeat request feedback.

12. The method of claim 11, further comprising:
    determining, from the DCI, a look-up value; and
    determining the timing offset by using the look-up value in a look-up of timing offsets, wherein the timing offsets are configured via radio resource control (RRC) signaling for a hybrid automatic repeat request process or for a AP-CSI reporting.

13. The method of claim 1, wherein the DCI schedules data reception on a PDSCH, and wherein the UE is configured to perform rate matching that uses an AP-CSI reference signal resource element and at least one of: a PDSCH data resource element or a PDSCH demodulation reference signal resource element.

14. The method of claim 1, further comprising:
sending, to the network, the AP-CSI report on a PUCCH based on a constraint, wherein the constraint includes a maximum number of CSI reports, a quantity limitation per CSI report, a codebook limitation, or a wideband pre-coding matrix indicator (PMI) reporting configuration, or a wideband channel quality indicator (CQI) reporting configuration.

15. A user equipment (UE) comprising:
one or more processors; and
one or more memories storing instructions that, upon execution by the one or more processors, configure the UE to:
receive, from a network, a channel state information (CSI) configuration;
receive, from the network, downlink control information (DCI) having a format for scheduling physical downlink shared channel (PDSCH) data reception;
determine that the DCI triggers an aperiodic-CSI (AP-CSI);
generate, based on the CSI configuration, an AP-CSI report; and
determine, from the DCI, a timing offset for a physical uplink control channel (PUCCH) resource associated with sending the AP-CSI report.

16. The UE of claim 15, wherein the DCI has a format 1_1 or 1_2, wherein the AP-CSI report is generated based on a CSI-reference signal, a CSI-interference measurement (IM), or a synchronization signal block (SSB), and wherein the AP-CSI report is sent on a PUCCH.

17. The UE of claim 15, wherein the DCI schedules data reception on a PDSCH, and wherein the AP-CSI report is generated based on a PDSCH decoding performance associated with the data reception, wherein the AP-CSI report includes soft negative acknowledgement (NACK) information or soft acknowledgement (ACK) information, wherein the soft NACK information indicates accumulated soft information from a first number of retransmission repetitions or a second estimated number of retransmission repetitions for successful decoding, wherein the soft ACK information indicates overly used resources or a third number of retransmission repetitions used for the successful decoding.

18. A method implemented by a network node, the method comprising:
sending, to a user equipment (UE), a channel state information (CSI) configuration;
sending, to the UE, downlink control information (DCI) having a format for scheduling physical downlink shared channel (PDSCH) data reception and indicating a timing offset for a physical uplink control channel (PUCCH) resource associated with sending an AP-CSI reference signal (CSI-RS) report;
sending, to the UE, a CSI-RS; and
receiving, from the UE, an AP-CSI report that is triggered based on the DCI and that is generated based on the CSI configuration.

19. The method of claim 18, wherein the DCI has a format 1_1 or 1_2, and wherein the AP-CSI report is received on a PUCCH.

20. The method of claim 18, wherein the DCI schedules data reception on a PDSCH, and wherein the AP-CSI report is received in the PUCCH resource.

* * * * *